United States Patent [19]

Dinsmore

[11] 4,402,142
[45] Sep. 6, 1983

[54] ELECTRONIC COMPASS FOR AUTOMOTIVE VEHICLES

[76] Inventor: Robert C. Dinsmore, G-3100 Miller West, Flint, Mich. 48507

[21] Appl. No.: 261,524

[22] Filed: May 7, 1981

Related U.S. Application Data

[63] Continuation-in-part of Ser. No. 184,032, Sep. 4, 1980, abandoned.

[51] Int. Cl.³ .............................................. G01C 17/24
[52] U.S. Cl. ....................................... 33/348; 33/357; 33/363 R
[58] Field of Search ..................... 33/361, 355 R, 357, 33/362, 363 R, 363 Q, 348

[56] References Cited

U.S. PATENT DOCUMENTS

| | | | |
|---|---|---|---|
| 2,924,886 | 2/1960 | Cullen | 33/363 R |
| 3,311,821 | 3/1967 | Brunel | 33/357 X |
| 3,425,648 | 2/1969 | Wipff et al. | 33/357 |
| 3,881,258 | 5/1975 | Iddings | 33/357 |
| 3,905,121 | 9/1975 | Takeda et al. | 33/361 |
| 4,030,204 | 6/1977 | Edwards | 33/361 |
| 4,232,451 | 11/1980 | Thomsen | 33/361 |
| 4,250,626 | 2/1981 | Lazar | 33/361 |

FOREIGN PATENT DOCUMENTS 666594 10/1938 Fed. Rep. of Germany ........ 33/357
1175606 12/1969 United Kingdom ............ 33/363 R Primary Examiner—William D. Martin, Jr.
Attorney, Agent, or Firm—Barnes, Kisselle, Raisch, Choate, Whittemore & Hulbert

[57] ABSTRACT

An electronic compass for vehicles such as automobiles comprising a float mechanism including a permanent magnet for following the earth's magnetic field and four Hall effect sensors for detecting magnet orientation at points corresponding to the cardinal compass points. The Hall effect sensors are connected to triggering circuits having overlapping thresholds so that two circumferentially adjacent sensors and sensor trigger circuits cooperate to indicate not only the corresponding cardinal compass points but also the secondary compass point intermediate the cardinal points. The sensor trigger circuitry is connected to a two-character multiple-segment display for indicating vehicle orientation at either one of the four cardinal compass points or one of the four secondary compass points intermediate successive cardinal points. Circuitry for compensating for variations in the earth's magnetic field caused by the vehicle comprises a pair of electromagnetic coils having perpendicular axes which perpendicularly intersect the axis of float rotation and variable resistors coupled to the coils for varying the magnetic compensation field generated by each coil independently of the other.

7 Claims, 10 Drawing Figures

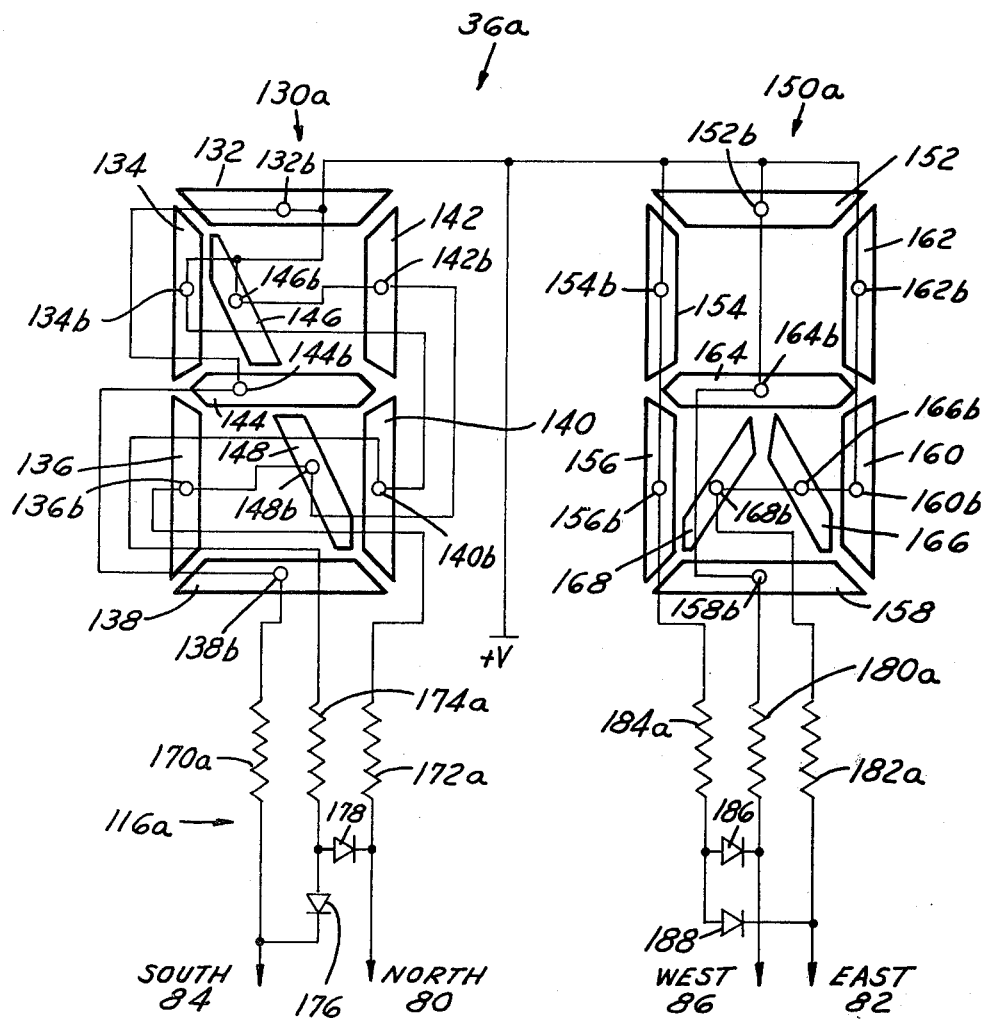

ELECTRONIC COMPASS FOR AUTOMOTIVE VEHICLES

This is a continuation-in-part of application Ser. No. 184,032 filed Sept. 4, 1980, now abandoned.

The present invention relates to electromagnetic compasses, and more particularly to compasses of a type specifically adapted for use on vehicles such as automobiles and the like.

An object of the present invention is to provide a compass for vehicles such as automobiles and the like having a digital-type character readout or display indicative of vehicle orientation or direction relative to the earth's magnetic field.

A further object of the invention is to provide a vehicle compass which employs a minimum number of moving parts and state-of the art electronics so as to be both economical in assembly and reliable in operation.

Yet another object of the invention is to provide a versatile vehicle compass which may be provided as an aftermarket add-on feature or which may be readily built into an automobile as an original equipment option.

Another object of the invention is to provide a vehicle compass which includes means for compensating for variations in the earth's magnetic field caused by metal vehicle parts which can be readily adjusted or readjusted by unskilled personnel and is all-electronic in nature—i.e. with no moving parts.

The invention, together with additional objects, features and advantages thereof, will be best understood from the following description, the appended claims and the accompanying drawings in which:

FIG. 10 is a schematic diagram similar to that of FIG. 6 illustrating an embodiment of the compass display.

Figure 1:
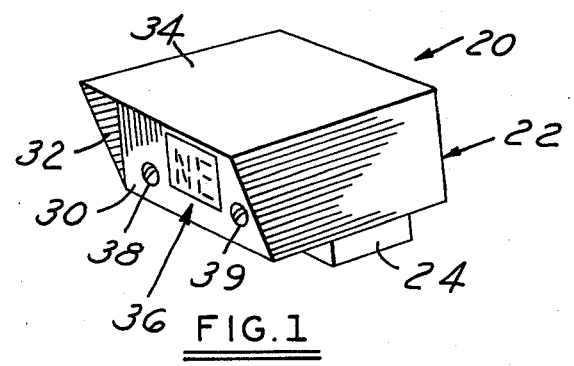
FIG. 1 is a perspective view of one presently preferred embodiment of the vehicle compass in accordance with the invention.
Figure 2:
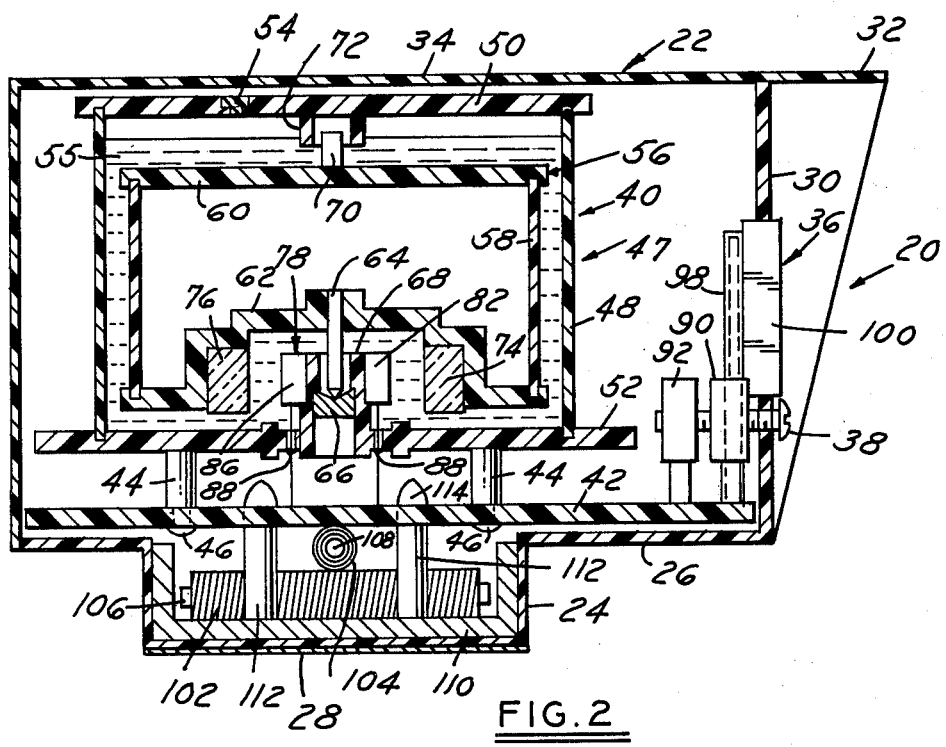
FIG. 2 is a sectional view in side elevation of the compass embodiment illustrated in FIG. 1.

Referring to FIGS. 1 and 2, one presently preferred embodiment 20 of a compass in accordance with the invention which is particularly well adapted for the automobile aftermarket is illustrated as comprising a generally rectangular housing 22 of non-magnetic construction such as drawn aluminum or molded plastic. A hollow embossment 24 extends integrally downwardly from a lower wall 26 of housing 22 and has adhesive tape 28 or the like on the embossment lower surface for mounting compass 20 onto a vehicle dashboard (not shown). A housing front wall 30 is partially shaded by an overhang 32 projecting forwardly of housing top wall 34, and includes openings for receiving a compass optical display 36 and magnetic field compensation adjustment screws 38 and 39. Leads (not shown) extend from housing 22 for connecting the compass to a source of d.c. power such as the vehicle battery.

Internally of housing 22, and referring in particular to FIG. 2, compass 20 comprises a magnetic float subassembly 40 mounted to and spaced above an electronic printed circuit board 42 by the standoffs 44 and the mounting screws 46. Float assembly 40 includes a hollow sealed enclosure 47 comprising the generally flat top and bottom walls 50,52 and a cylindrical side wall 48 having upper and lower edges sealingly received in circular grooves in the top and bottom walls. Top wall 50 has an opening normally closed by a plug 54 for filling the float housing with a float-suspension fluid 55 such as water. A hollow float 56 is carried within housing 40 surrounded by fluid 55 and comprises a cylindrical side wall 58 having upper and lower edges sealingly received in circular grooves in top and bottom float end walls 60,62. A pin 64 projects downwardly from bottom float wall 62 and rides upon the concave upper surface of a jewel 66 mounted to enclosure wall 52 by the hollow sleeve 68 such that float 56 is adapted to pivot on jewel 66 about the axis of pin 64. A guide pin 70 projects upwardly from float top wall 60 and is loosely captured within a blind collar 72 integrally extending downwardly from enclosure top wall 50 for permitting free rotation of float 56 about the axis of pin 64 while preventing tipping of the float in a direction perpendicular to the axis of rotation.

Figure 3:
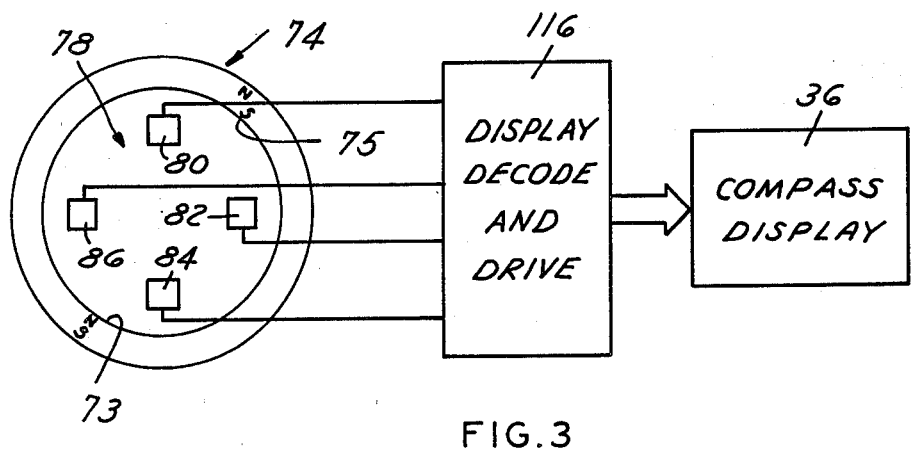
FIG. 3 is a partially schematic and partially functional block diagram of a compass in accordance with the invention.

Referring to FIGS. 2 and 3, a permanent magnet 74 in the form of an annular ring is externally mounted on a shoulder 76 in float bottom wall 62 coaxially with the axis of pivot pin 64 and encircles a uniform circular array 78 of magnetic sensors carried at circumferentially spaced locations around the outer surface of jewel-mounting collar 68. Preferably, magnetic sensor array 78 comprises four Hall effect sensor assemblies 80,82, 84 and 86 positioned at quadrature locations around the float pivot axis and adapted to correspond in operation to the cardinal compass points north, east, south and west respectively. Electrical leads from sensors 80-86 project downwardly through sealed openings 88 (FIG. 2) in enclosure bottom wall 52 and are electrically connected to printed circuit board 42. As best seen in FIG. 3, ring magnet 74 is permanently polarized so as to generate an essentially linear magnetic field on an axis perpendicular to the axis of symmetry of sensor array 78, and therefore perpendicular to the axis of rotation of magnet 74 and float 56. This linear magnetic field is achieved by magnetizing ring 74 to possess a north magnetic pole on one portion 73 of the inside diameter of ring 74 and a south-polarized magnetic region 75 internally diametrically opposed to the north magnetic pole.

Figure 8:
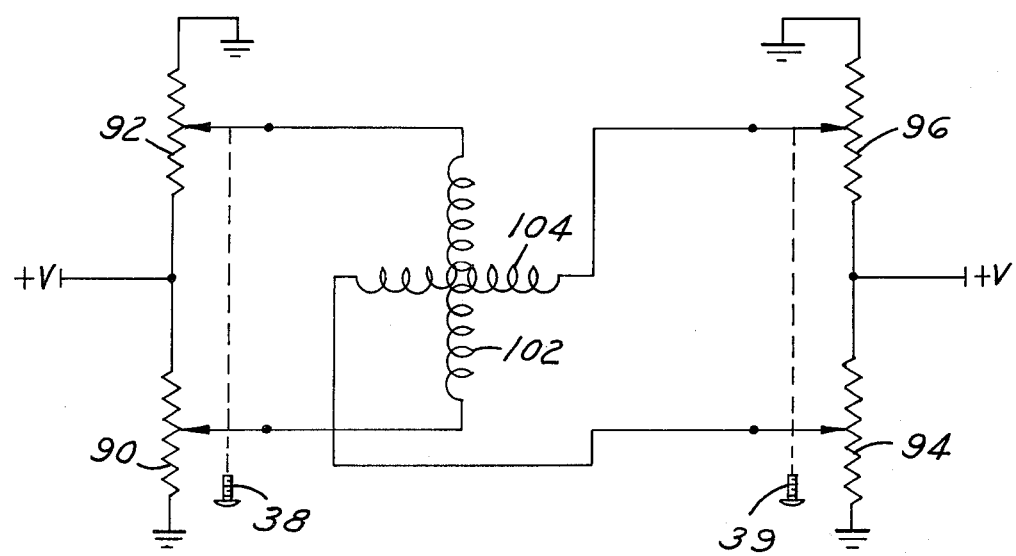
FIG. 8 is an electrical schematic diagram of the compass field adjustment circuit in accordance with the invention.

Referring now to FIGS. 1, 2 and 8, a pair of adjustable resistors 90,92 are mounted adjacent the forward edge on circuit board 42 and are conjointly adjustable by rotation of screw 38. A second pair of adjustable resistors 94,96 (FIG. 8) are mounted on circuit board 42 (FIG. 2) and are conjointly adjustable by screw 39 (FIGS. 1 and 8) independently of resistors 90,92. A pair of electromagnetic coils 102,104 having corresponding cores 106,108 of magnetically permeable material are mounted beneath circuit board 42 with the axes of coils 102,104 perpendicular to each other and perpendicularly intersecting the axis of rotation of float 56 about pin 64. Coils 102,104 are captured in assembly in the described orientation by the cap 110 spaced beneath circuit board 42 by the standoffs 112 and mounted thereto by the screws 114.

Referring in particular to FIG. 8, the four variable resistors 90,92,94 and 96 are identical. Each variable resistor has outside terminals connected across a d.c. voltage source such as a vehicle battery and a resistance-variable wiper terminal intermediate the outside terminals. The wipers of variable resistors 90,92 are conjointly controlled by screw 38, while the wipers of variable resistors 94,96 are conjointly controlled by screw 39. Coil 102 is connected across the resistance-variable terminals of resistors 90,92 while coil 104 is connected across the resistance-variable terminals of resistors 94,96. In accordance with one important aspect of the invention, resistors 90–96 are pre-adjusted so that the voltages appearing across each wiper pair are exactly complementary—i.e. the sum of the voltages across the wipers of resistors 90,92 and the sum of the voltages across the wipers of resistors 94,96 are each equal to +V at all positions of screws 38,39. This may be accomplished by turning the wiper drive mechanism of each resistor 90–96 to the limit in one direction prior to coupling to screws 38,39.

Figure 4:
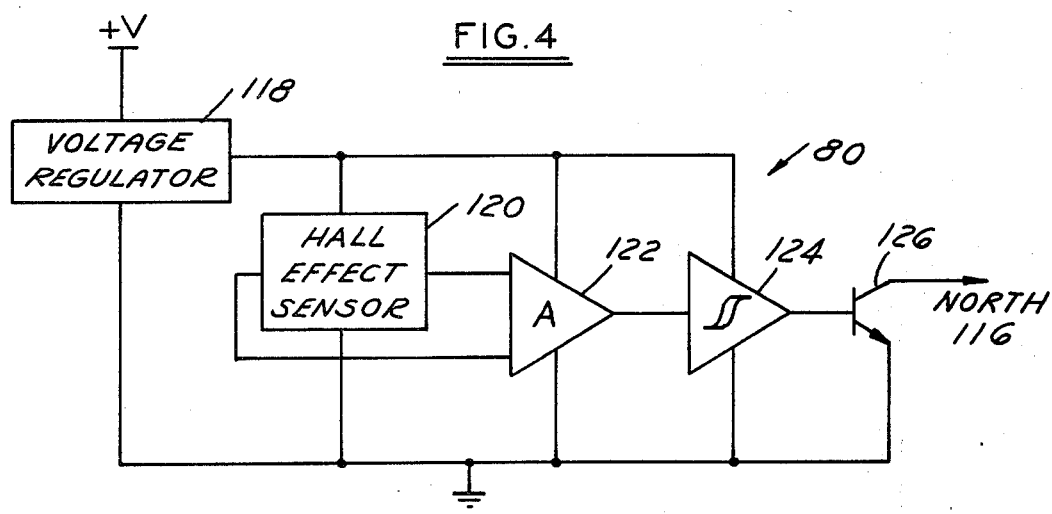
FIG. 4 is an electrical schematic diagram of a portion of the compass as illustrated in functional form in FIG. 3.

Hall effect sensor assembly 80 is illustrated in schematic detail in FIG. 4 as comprising a voltage regulator 118 connected to a positive d.c. voltage source such as the vehicle battery. A Hall effect sensor 120 has current input leads connected across the regulated d.c voltage and ground outputs of regulator 118, and field sensing output leads connected to the inputs of an operational amplifier 122. The output of amplifier 122, which varies as a function of the strength and polarity of the magnetic field sensed by Hall effect sensor 120, is connected to the input of a Schmitt trigger 124. Trigger 124 provides a digital output to the base of an NPN transistor 126 which switches from a low or ground state to a high or positive state when the strength of the magnetic field sensed by sensor 120 exceeds a preselected threshold level at a preselected polarity. The emitter of transistor 126 is connected to ground and the collector provides a digital signal indicative of a selected cardinal orientation, north in the case of sensor assembly 80. The remaining sensor assemblies 82–86 are identical to assembly 80 shown in FIG. 4. The magnetic polarity to which each sensor 120 is responsive is selected by positioning of sensor assemblies 80–86 with respect to the float axis of rotation. All sensors 80–86 are identically oriented with respect to the float axis and, in the embodiment to be described, are responsive to proximity of the south magnetic region 75 (FIG. 3) to switch the collector of transistor 126 to ground.

The collectors of the various transistors 126 of sensor assemblies 80–86 are connected to corresponding inputs of the compass display decode and drive circuitry 116 (FIG. 3) which provides an output to compass optical display 36 (FIGS. 1–3). Briefly stated, optical display 36 includes a plurality of optical elements, preferably LED's, mounted on a daughter board assembly 98 (FIG. 2) upstanding from the forward edge of circuit board 42. A light pipe 100 is mounted to daughter board 98 and projects through a display opening in compass housing front wall 30 (FIGS. 1 and 2). As will be described in greater detail in the discussion to follow, light pipe 100 includes a plurality of linear apertures or openings which align and cooperate with corresponding optical elements to provide a multiple-segment two-character compass display of vehicle orientation.

Figure 6:
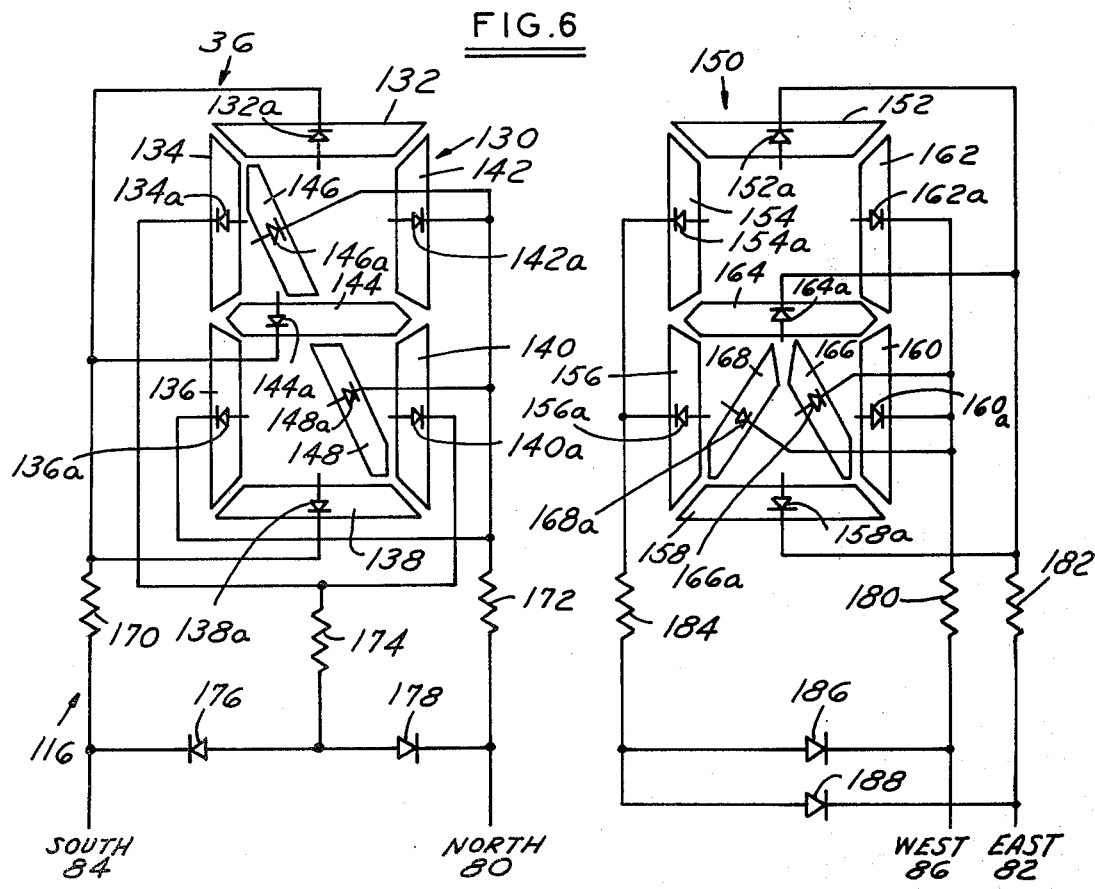
FIG. 6 is a schematic diagram of the compass display illustrated in functional block form in FIG. 3.

More specifically, the details of compass decode and display drive circuitry 116 and the two-character multiple-segment LED compass display 36 are illustrated schematically in FIG. 6. Referring to FIG. 6, the apertures in light pipe 100 which define the left multiple-segment character 130 comprise six linear segment apertures 132–142 disposed in a rectangular pattern having two aligned apertures 134,136 and 140,142 on each side, and one aperture 132 and 138 on each end. A seventh linear segment aperture 144 extends transversely across character 130 midway between end apertures 132,138 between apertures 134,136 and 140,142 on either side. Eighth and ninth segment apertures 146,148 extend diagonally across the rectangular pattern of character 130 from the upper left-hand corner adjacent the ends of apertures 132,134 to the lower right-hand corner adjacent the ends of apertures 138,140. The right-hand character 150 includes a second rectangular segment pattern defined by linear apertures 152–162, with an eighth aperture 164 again extending laterally across character 150 with ends between segment apertures 154,156 and 160,162. A pair of diagonal apertures 166,168 in an inverted V-shaped pattern extends between the lower corners of character 150 at the ends of apertures 156,168 and 158,160.

The previously described LEDs mounted on daughter board 98 (FIG. 2) are disposed within each corresponding segment aperture in light pipe 100 and are indicated in FIG. 6 by corresponding reference numerals followed by the suffix "a". The cathodes of diodes 138a,144a and 132a are connected in decode and drive circuitry 116 through a resistor 170 to the output of south-detecting sensor assembly 84 (FIG. 3) at the collector of corresponding transistor 126 (FIG. 4). Similarly, the cathodes of LEDs 136a,148a,142a and 146a are connected through a resistor 172 to the output of north-detecting sensor assembly 80. The cathodes of LEDs 134a and 140a are connected through a resistor 174 to the anodes of a pair of isolation diodes 176,178 which have their cathodes respectively connected to the outputs of south-detecting sensor assembly 84 and north-detecting sensor assembly 80. The cathodes of LEDs 160a,162a,166a and 168a are connected in circuitry 116 through a resistor 180 to the output of west-detecting sensor assembly 86. The cathodes of LEDs 158a,152a and 164a are likewise connected through a resistor 182 to east-detecting sensor 82. The cathodes of LEDs 154a and 156a are connected through a resistor 184 to the anodes of the diodes 186,188 which have their cathodes respectively connected to the outputs of sensor assemblies 86,82. In a connection not shown in FIG. 6 for purposes of clarity, the anodes of all LEDs 132a through 168a are coupled to the positive d.c. source.

Figure 7A:
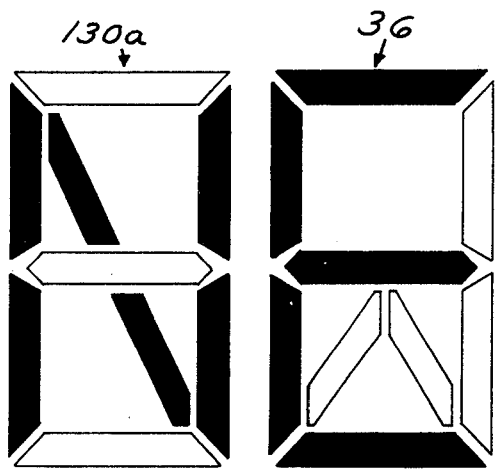
FIGS. 7A and 7B are graphic illustrations useful in understanding operation of the compass display.
Figure 7B:
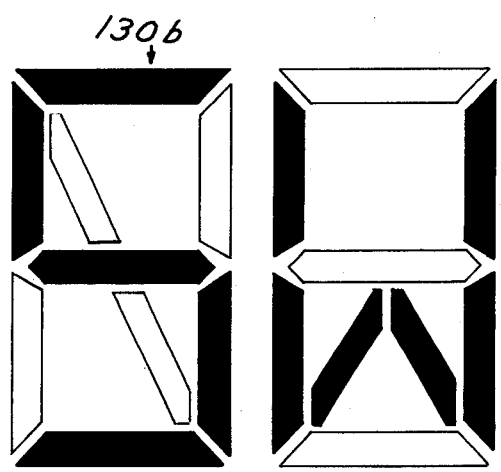

In operation first of display detection and drive circuitry 116 (FIGS. 3 and 6) and of compass display 36 (FIGS. 3, 6, 7A and 7B), upon detection of a north vehicle orientation by sensor assembly 80 and a low or ground signal at the collector of corresponding transistor 126 (FIG. 4), display LEDs 136a, 142a, 146a, 148a (FIG. 6) are energized through resistor 172 while LEDs 134a,140a are energized through resistor 174 and diode 178. The character "N" is thereby displayed at the left character position by segment apertures 134,136,140,142,146,148 in cooperation with the corresponding LEDs previously mentioned and as shown in FIG. 7A. Likewise, detection of a south orientation by sensor assembly 84 energizes LEDs 132*a*, 138*a*, 144*a* through resistor 170 and LEDs 134*a*, 140*a* through resistor 174 and diode 176. The character "S" is thereby displayed at the left character position as shown in FIG. 7B. It will be noted that LEDs 134*a* and 140*a* are common to both characters "N" and "S" and are energized during display of either character through resistor 174. Diodes 176,178 prevent energization of the LEDs unique to the "S" character display when an "N" is to be displayed and vice versa.

In a similar manner at the right character position, detection of an east orientation by sensor assembly 82 energizes LEDs 152*a*, 158*a*, 164*a* through resistor 182, and LEDs 154*a*, 156*a* through resistor 184 and diode 188 to generate an "E" display at the right character position as shown in FIG. 7A. Detection of a west orientation energizes LEDs 160*a*, 162*a*, 166*a*, 168*a* through resistor 180, and LEDs 154*a*, 156*a* through resistor 184 and diode 186 to display a "W" at the right character position as shown in FIG. 7B. Again, it will be noted that LEDs 154*a*, 156*a* are common to both "E" and "W" display characters, and that diodes 186,188 effectively isolate the LEDs unique to the "E" character display from those unique to the "W" character display. The values of resistors 170–174 and 180–184 are determined by the numbers of LEDs energized therethrough so that all LEDs have substantially identical brightness when energized. It will thus be particularly appreciated in accordance with an important feature of the invention that two-character display 36 is uniquely adapted to be operated selectively to display eight different directional compass character combinations indicative of vehicle orientation. The characters "N" and "S" at left character position 130 are mutually exclusive, as are the characters "E" and "W" in right character position 150. However, the left and right characters may be energized separately or in combination, yielding the following possible combinations: "N", "E", "NE", "S", "SE", "W", "SW" and "NW".

In operation now of the overall compass electronic circuitry, it will be evident from the previous discussion that sensor assemblies 80–86 themselves provide digital output signals to decoder drive circuit 116 indicative of the four cardinal compass points as a function of position of ring magnet 74 about its rotational axis. Magnet 74, in turn, generates an essentially linear magnetic field and is mounted for rotation on float 56 to follow the earth's magnetic field. Most preferably, and in accordance with an important feature of the present invention, the strength of the magnetic field generated by magnet 74, the circumferential dimension of magnetized portions 73,75 (FIG. 3), the radial dimension between the inside magnet diameter and sensor assemblies 80–86, and the thresholds of Schmitt triggers 124 (FIG. 4) in the various sensor assemblies are preselected or factory set so as to indicate not only the cardinal compass points when the appropriate magnetic pole is aligned with or proximate to the corresponding sensor, but also to indicate secondary compass points intermediate adjacent cardinal compass points when the magnetic poles are between successive sensor assemblies.

Figure 5:
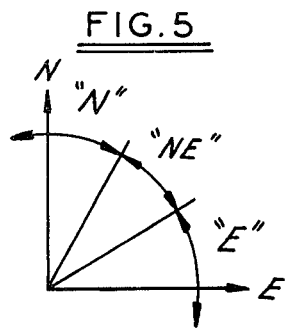
FIG. 5 is a graphic illustration useful in understanding operation of the invention.

More particularly, and as illustrated graphically in FIG. 5, the above-noted parameters, including specifically the trigger threshold of sensor assembly 80, are preselected or preset to provide an indication of north or "N" at display 36 over an angular range of the linear magnetic field generated by magnet 74 on the order of sixty to seventy degrees on either side of true north orientation. Similarly, the trigger level of sensor 82, etc. is preselected to provide an east or "E" directional indication at display 36 over an angular range of sixty to seventy degrees on either side of true east orientation. Thus, sensors 80,82 cooperate to provide a northeast or "NE" directional indication for a range of about thirty degrees intermediate the north and east compass points. In the particular orientation of magnet 74 illustrated in FIG. 3, the field of the magnet lies at an angle of about forth-five degrees clockwise and the south polar region 75 to which sensor assemblies 80–86 are responsive lies about midway between assemblies 80,82. Sensor assemblies 80,82 are therefore turned on, while sensor assemblies 84,86 are turned off, so as to provide a northeast or "NE" compass display as shown in FIGS. 1 and 7A.

In a similar manner, sensor assemblies 82,84 cooperate to provide east, southeast and south directional indications as magnet 74 rotates clockwise as viewed in FIG. 3. Likewise, sensor assemblies 84,86 cooperate to provide compass display indications of south, southwest and west, while sensors 86,80 cooperate to provide compass indications of west, northwest and north as magnet 74 continues to rotate. It will be appreciated that the built-in hysteresis of the various Schmitt triggers 124 (FIG. 4) provides a constant compass display even though the vehicle orientation may vary slightly due to road variations, and that the effective angular threshold of the various Schmitt triggers will vary slightly depending upon the direction of rotation of ring magnet 74.

Figure 9:
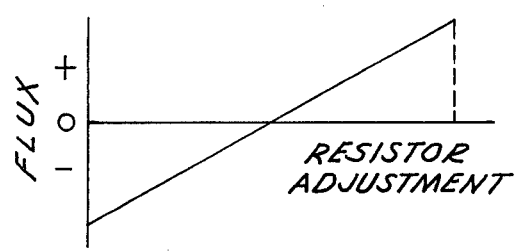
FIG. 9 is a graph useful in understanding operation of the adjustment circuit illustrated in FIG. 8.

In operation finally of the compensation circuit illustrated schematically in FIG. 8, the compass is first mounted in fixed position relative to a vehicle and the vehicle is oriented in a known compass direction. The screws 38,39 are then adjusted by an operator, so that the orthogonal magnetic fields generated by coils 102,104 vary independently in strength, until compass display 36 indicates the known compass and vehicle direction or orientation. As each screw is turned by the operator, the current through the corresponding coil and the magnetic flux generated thereby vary in strength and direction as shown in FIG. 9 from a maximum in one direction when the variable resistance wipers are at corresponding limits in one direction and full voltage is applied across the coil at one polarity, through zero when the wipers are at the midpoints of the resistors and there is no voltage drop across the coil, to a maximum in the opposite direction when the wipers are at the limit and full voltage is applied across the coil at the opposite polarity. When properly adjusted, the field generated by each coil is effective to compensate for variations in the earth's magnetic field in the orientation of that coil caused by the steel and other magnetic material of the vehicle body, etc. Once the adjustments have been made, the compass will thereafter read correct vehicle orientation relative to the earth's magnetic field in the manner previously described.

Although the invention has been described in connection with a particular presently preferred embodiment thereof, it will be recognized that the features of the invention are adaptable to wide variation and modification. For example, the preferred embodiment of the invention includes integrated Hall effect sensors and sensor electronics as previously described in connection with FIG. 4. However, it is within the scope of the present invention to provide the Hall sensors as separate units mounted within housing 40 (FIG. 2) and the sensor electronics as discrete elements mounted on circuit board 42. Likewise, it is contemplated that magnetic sensors other than Hall effect sensors may be utilized without departing from the scope of invention.

Although a ring magnet 74 is preferred for disposition encompassing an inner array of sensors 80–86, it is also possible to provide the magnet in the form of a linear or bar element rotatable within an outer circumferential array of magnetic sensors. It is further contemplated and within the scope of the invention in its broadest aspects to provide optical float orientation detection means or the like separate from the float-orienting magnet. However, magnetic detection means as previously described is preferred since such permit the float magnetic to be utilized for essentially two purposes: orientation of the float with respect to earth's magnetic field and detection or sensing of such orientation.

The integral compass assembly 20 previously described is preferred for aftermarket applications. However, it may be advantageous and even preferable in some instances to divide the compass in accordance with the invention into separate components or elements consisting of the float and compensation coil subassembly as one component for disposition at one location, and the display and compensation adjustment screws as a second component for disposition at a separate location. For example, it is contemplated that the compass provided by the invention may be built into automobiles during original equipment manufacture, in which case the display and adjustment screws may be located on the vehicle dashboard at a position convenient for viewing by a driver of passenger, while the float and compensation coils may be located remotely of the display at any convenient vehicle location and connected thereto by a suitable harness or cable. The invention is intended to embrace the foregoing and all other alternatives, modifications and variations as fall within the spirit and broad scope of the appended claims.

FIG. 10 illustrates a modified form of compass display 36a wherein the various display diodes are connected in series to the input signal lines, rather than in parallel as in FIG. 6. The diodes, which preferably comprise LED chips, are designated by the suffix "b" within the appropriate light pipe aperture, shown in phantom for purposes of clarity. In particular, diodes 132b,144b and 148b are connected in series in character 130a through a current limiting resistor 170a in decode circuitry 116a to the south sensor assembly 84 (FIG. 3). Similarly, diodes 144b, 142b, 148b and 136b are connected in series through a resistor 172a to sensor assembly 80. Diodes 134b and 140b are connected through resistor 174b, and thence through diodes 176,178 to assemblies 84,80 respectively.

Diodes 152b,164b and 158b are connected in character 150a in series through a resistor 180a to west sensor assembly 86 (FIG. 3). Diodes 162b,160b,166b and 168b are connected through a resistor 182a to east sensor assembly 82. Diodes 154b and 156b are likewise connected in series through resistor 184a, and thence through diodes 186,188 to sensor assemblies 86,82 respectively. It has been found that series connection of the LED's as in FIG. 10 gives improved control of brightness uniformity.

The invention claimed is:

1. A compass for vehicles such as automobiles and the like comprising first means adapted for fixed disposition with respect to said vehicle and second means adapted for movement with respect to said first means for following the earth's magnetic field, sensing means responsive to relative positions of said first and second means for indicating orientation of said vehicle with respect to the earth's magnetic field, and means responsive to said sensing means for displaying said orientation including two-character display means for displaying said orientation as one of the characters "N", "E", "S" and "W" indicative of the cardinal compass points and as two-character combinations of said characters indicative of secondary compass points intermediate successive ones of said cardinal compass points, said two character display means comprising a multiple-aperture light pipe in which the first display character is a multiple-segment character defined by six linear segment apertures disposed in a first rectangular pattern having two segment apertures on each side and one segment aperture on each end, a seventh segment aperture extending across said first rectangular pattern between said two segment apertures on each side of said first rectangular pattern, and eighth and ninth segment apertures extending diagonally across said first rectangular pattern, and the second character is a multiple-segment character defined by six linear segment apertures disposed in a second rectangular pattern laterally adjacent to said first rectangular pattern and having two segment apertures on each side and one segment aperture on each end, a seventh segment aperture extending across said second rectangular pattern between said two segment apertures on each side of said second rectangular pattern, eighth and ninth segment apertures extending in an inverted V-shaped pattern between lower corners of said second rectangular pattern, said first through said seventh segments of said first display character being identical to said first through said seventh segments of said second display character, said two character display means further comprising eighteen individually selectable light emitting means disposed one in association with each said aperture for selectively and alternately indicating at said first display character the letters "N" and "S" and for selectively and alternately indicating at said second display character the letters "E" and "W".

2. The compass set forth in claim 1 wherein said second means comprises a permanent magnet adapted to rotate about an axis which is fixed with respect to said vehicle as a function of the earth's magnetic field, wherein said first means comprises four discrete magnetic field sensor elements disposed at quadrature orientations about said axis, and wherein said sensing means includes four amplifier means each individually responsive to an associated said sensor element for providing an output signal indicative of a cardinal compass point over a preselected angular range about said axis, with said angular ranges of said amplifier means associated with adjacent sensor elements overlapping so as to provide indications of secondary compass points intermediate said cardinal compass points within said overlap.

3. The compass set forth in claim 2 wherein said magnetic sensor elements comprise Hall effect sensors.

4. The compass set forth in claim 1 further comprising means for compensating for variations in the earth's magnetic field caused by said vehicle comprising first and second electromagnetic coil means having axes perpendicular to each other and perpendicularly intersecting the axis of rotation of said second means, and means for separately adjusting the magnetic field generated by each said coil means.

5. The compass set forth in claim 4 wherein said means for separately adjusting said fields comprises four variable resistance means having end terminals connected across a source of electric power and variable resistance terminals, means connecting each said coils across a corresponding pair of said variable resistance terminals, and means for conjointly adjusting resistance at each said pair of variable resistance terminals independently of the other said pair.

6. In a compass for vehicles such as automobiles and the like, and including first means adapted for fixed disposition with respect to a said vehicle, second means including permanent magnet means mounted for rotational movement about an axis with respect to said first means as a function of the earth's magnetic field and means for indicating orientation of said vehicle with respect to the earth's magnetic field as a function of position of said second means with respect to said first means, means for compensating for variations in the earth's magnetic field upon said second means caused by said vehicle comprising first and second electromagnetic coil means mounted in fixed position with respect to said first means on axes which are perpendicular to each other and which perpendicularly intersect said axis, and means for separately adjusting current flow through each said coil means so as to adjust the effective magnetic field generated by each said coil means.

7. The compass set forth in claim 6 wherein said means for separately adjusting said fields comprises four variable resistance means having end terminals connected across a source of electric power and variable resistance terminals, means connecting each said coils across a corresponding pair of said variable resistance terminals, and means for conjointly adjusting resistance at each said pair of variable resistance terminals independently of the other said pair.

* * * * *